(12) United States Patent
Jiang

(10) Patent No.: US 11,127,982 B2
(45) Date of Patent: Sep. 21, 2021

(54) ELECTRODE ASSEMBLY AND BATTERY WITH SECTIONED ACTIVE LAYERS

(71) Applicant: Ningde Amperex Technology Limited, Fujian (CN)

(72) Inventor: Jing Jiang, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 119 days.

(21) Appl. No.: 16/208,551

(22) Filed: Dec. 3, 2018

(65) Prior Publication Data

US 2019/0319310 A1 Oct. 17, 2019

(30) Foreign Application Priority Data

Apr. 12, 2018 (CN) .......................... 201820516810.6

(51) Int. Cl.
| | |
|---|---|
| *H01M 10/0587* | (2010.01) |
| *H01M 4/13* | (2010.01) |
| *H01M 2/18* | (2006.01) |
| *H01M 2/26* | (2006.01) |
| *H01M 4/70* | (2006.01) |
| *H01M 50/463* | (2021.01) |
| *H01M 50/538* | (2021.01) |
| *H01M 4/02* | (2006.01) |

(52) U.S. Cl.
CPC ......... *H01M 10/0587* (2013.01); *H01M 4/13* (2013.01); *H01M 4/70* (2013.01); *H01M 50/463* (2021.01); *H01M 50/538* (2021.01); *H01M 2004/021* (2013.01)

(58) Field of Classification Search
CPC ........ H01M 10/0587; H01M 10/0431; H01M 2/263
See application file for complete search history.

(56) References Cited

U.S. PATENT DOCUMENTS

| | | | | |
|---|---|---|---|---|
| 6,190,426 | B1 * | 2/2001 | Thibault | ................. H01M 6/40 29/623.2 |
| 2002/0031703 | A1 * | 3/2002 | Kameyama | ......... H01M 2/0212 429/162 |

(Continued)

FOREIGN PATENT DOCUMENTS

| | | | | |
|---|---|---|---|---|
| WO | WO-2016174811 | A1 * | 11/2016 | ........ H01M 10/0525 |
| WO | WO-2018038448 | A1 * | 3/2018 | ............ H01M 10/04 |

*Primary Examiner* — Imran Akram
(74) *Attorney, Agent, or Firm* — Morgan, Lewis & Bockius LLP

(57) ABSTRACT

The present application provides an electrode assembly including a first electrode sheet including a first current collector and a first active substance layer arranged on the surface of the first current collector; the first electrode sheet includes a first section and a second section; both surfaces of the first section is applied with the first active substance layer while one surface of the second section is applied with the first active substance layer; the second section is electrically connected to the first section, and the first section is closer to a starting end of the first electrode sheet than the second section is; wherein the second section includes a first bending section, and the first bending section is a region where the first electrode sheet is bent for the first time. Thereby, the risk of lithium decomposition of the battery is reduced, and the life is prolonged.

17 Claims, 6 Drawing Sheets

(56) References Cited

U.S. PATENT DOCUMENTS

| | | | |
|---|---|---|---|
| 2007/0059590 A1* | 3/2007 | Hayashi | H01M 10/0431 |
| | | | 429/94 |
| 2014/0099525 A1* | 4/2014 | Kwon | H01M 10/0436 |
| | | | 429/94 |
| 2017/0170525 A1* | 6/2017 | Mitani | H01M 10/0587 |
| 2018/0130994 A1* | 5/2018 | Yamaguchi | H01M 10/0422 |
| 2019/0229362 A1* | 7/2019 | Yoon | H01M 4/0404 |

* cited by examiner

ELECTRODE ASSEMBLY AND BATTERY WITH SECTIONED ACTIVE LAYERS

CROSS REFERENCE TO RELATED APPLICATION

This application claims priority to and benefits of China Patent Application No. 201820516810.6, filed with the China National Intellectual Property Administration on Apr. 12, 2018, and the entire content of which is incorporated herein by reference.

TECHNICAL FIELD

The present application relates to the field of battery, in particular, to an electrode assembly and a battery.

BACKGROUND TECHNOLOGY

As the demand for battery life continues to increase, the energy density of polymer lithium-ion batteries is constantly challenged. The traditional method to increase the energy density of the battery is mainly for battery components (such as using thinner current collectors, separators, soft coatings, etc.) and production processes (such as increasing the compaction density of positive and negative active materials to increase unit capacity, etc.). However, for example, the further reduction of the thickness of the current collector and the separator increases the risk of short circuit of the battery, and also puts forward higher requirements for the material production and preparation process.

The area of the innermost blank substrate region in the existing electrode assembly is large, which reduces the specific gravity of the active substance, and is disadvantageous for improving the energy density of the battery. Although the double-sided insertion structure of the starting end of the existing electrode sheet improves the energy density of the battery, there exists a risk of lithium deposition at the starting end of the electrode sheet, resulting in a decrease in the capacity of the electrode assembly, a shortened life, and a serious safety hazard.

SUMMARY OF THE APPLICATION

In view of the problems in the related art, an object of the present application is to provide an electrode assembly capable of reducing the risk of lithium deposition at the starting end of the electrode sheet.

For these purposes, the embodiment of the present application provides an electrode assembly, including: a first electrode sheet including a first current collector and a first active substance layer arranged on a surface of the first current collector; wherein the first electrode sheet includes a first section and a second section; the first active substance layer is disposed on both surfaces of the first section, while the first active substance layer is disposed on only one surface of the second section; and the second section is electrically connected to the first section, and the first section is closer to a starting end of the first electrode sheet than the second section is; the second section including a first bending section, and the first bending section is a region where the first electrode sheet is bent for a first time.

According to the embodiment of the present application, a second electrode sheet includes a second current collector and a second active substance layer disposed on a surface of the second current collector, and the second electrode sheet includes a third section and a fourth section, and the third section is electrically connected to the fourth section, and the third section is closer to a starting end of the second electrode sheet than the fourth section; wherein the second active substance layer are disposed on both surfaces of the third section, and the fourth section includes a second bending section, and the second bending section is a region where the second electrode sheet is bent in a winding direction for a first time.

According to the embodiment of the present application, an orthographic projection of a starting end and a finishing end of the second section falls on the third section in direction T.

According to the embodiment of the present application, the first section and the third section extend in opposite directions in a direction W perpendicular to the direction T; and the first active substance layer is located inside the first section facing the second active substance layer is located inside the third section.

According to the embodiment of the present application, the electrode assembly further includes: a separator arranged between the first electrode sheet and the second electrode sheet; wherein the separator includes a first separator and a second separator, and a starting end of the first separator is in contact with a starting end of the second separator, and a trailing end of a first separator is in contact with a trailing end of the second separator.

According to the embodiment of the present application, the electrode assembly further includes: a first electrode tab electrically connected to the first current collector; wherein the number of the separator between the first electrode tab and the second current collector does not exceed two layers in the direction T.

According to the embodiment of the present application, wherein the first active substance layer includes a first gap configured to receive the first electrode tab, and the first electrode tab is electrically connected to the first current collector; and wherein the second active substance layer includes a second gap configured to receive the second electrode tab, and the second electrode tab is electrically connected to the second current collector.

According to the embodiment of the present application, the first electrode tab is integrally formed with the first current collector, and the second electrode tab is integrally formed with the second current collector.

According to the embodiment of the present application, the first electrode sheet is positive, and the second electrode sheet is negative; or the first electrode sheet is negative, and the second electrode sheet is positive.

According to the embodiment of the present application, the first electrode sheet includes a first empty foil region of which either surface is not applied with the first active substance layer, and the first empty foil region is arranged at a trailing end of the first electrode sheet, and wherein the second electrode sheet includes a second empty foil region of which either surface is not applied with the second active substance layer, and the second empty foil region is arranged at a trailing end of the second electrode sheet, and the second empty foil region facing the first empty foil region.

According to the embodiment of the present application, a battery including a soft coating and an electrode assembly packaged by the soft coating, and the electrode assembly described above is provided.

The beneficial technical effects of the present application are as follows: a region with active substance on one surface at the first bending position of a winding starting section of at least one of the first electrode sheet and the second electrode sheet is provided, thereby reducing the risk of lithium deposition of at least one of the first electrode sheet and the second electrode sheet, and prolonging the service life and reducing the security risks.

BRIEF DESCRIPTION OF THE DRAWINGS

In order to more clearly illustrate the technical solutions of embodiments of the present application or the prior art, the drawings used for the embodiments will be briefly described below. It is obvious that the drawings described below are only related to some embodiments of the present application. It will be apparent to one of ordinary skill in the art that other drawings may be obtained based on the accompanying drawings without inventive effort.

DETAILED DESCRIPTION OF THE EMBODIMENTS

The technical solutions of the embodiments of the present application will be clearly and completely described hereafter in connection with the figures of the embodiments of the present application. It is apparent that the described embodiments are only a part of the embodiments of the present application, but not the whole. Based on the embodiments of the present application, all the other embodiments obtained by those of ordinary skill in the art are within the scope of the present application.

The electrode assembly structure described in the specification of the present application is mainly a wound structure electrode assembly. The wound structure electrode assembly means that the electrode sheet and the separator of the entire core are formed by winding to form an electrode assembly, or a part of the electrode sheet and the separator are wound with each other while a part of the electrode sheet and the separator are superposed on each other.

In the present application, the empty foil region refers to the region where no active substance is present on both surfaces of the current collector, the single-sided first active substance layer region refers to the region where a first active substance layer is only present on one surface of the two surfaces of the first current collector, the second active substance layer region refers to the region where the second active substance layer is only present on one of the two surfaces of the second current collector, the double-sided first active substance layer region refers to the region where the first active substance layer is present on both surfaces of the first current collector, and the double-sided second active substance layer region refers to the region where the second active substance layer is present on both surfaces of the second current collector.

The following statements appearing in the present application, such as "starting end", "trailing end", "inside", "outside", "center", are all positioned with reference to the present drawings. The specific expression is explained as follows: the starting end of the first electrode sheet refers to the end where the first electrode sheet is initially wound inside the wound electrode assembly. The center of the electrode assembly is the geometric center of the approximate ellipse where the electrode assembly is located. The inside of the first electrode sheet refers to the side of the first electrode sheet facing the center of the electrode assembly.

Figure 1:
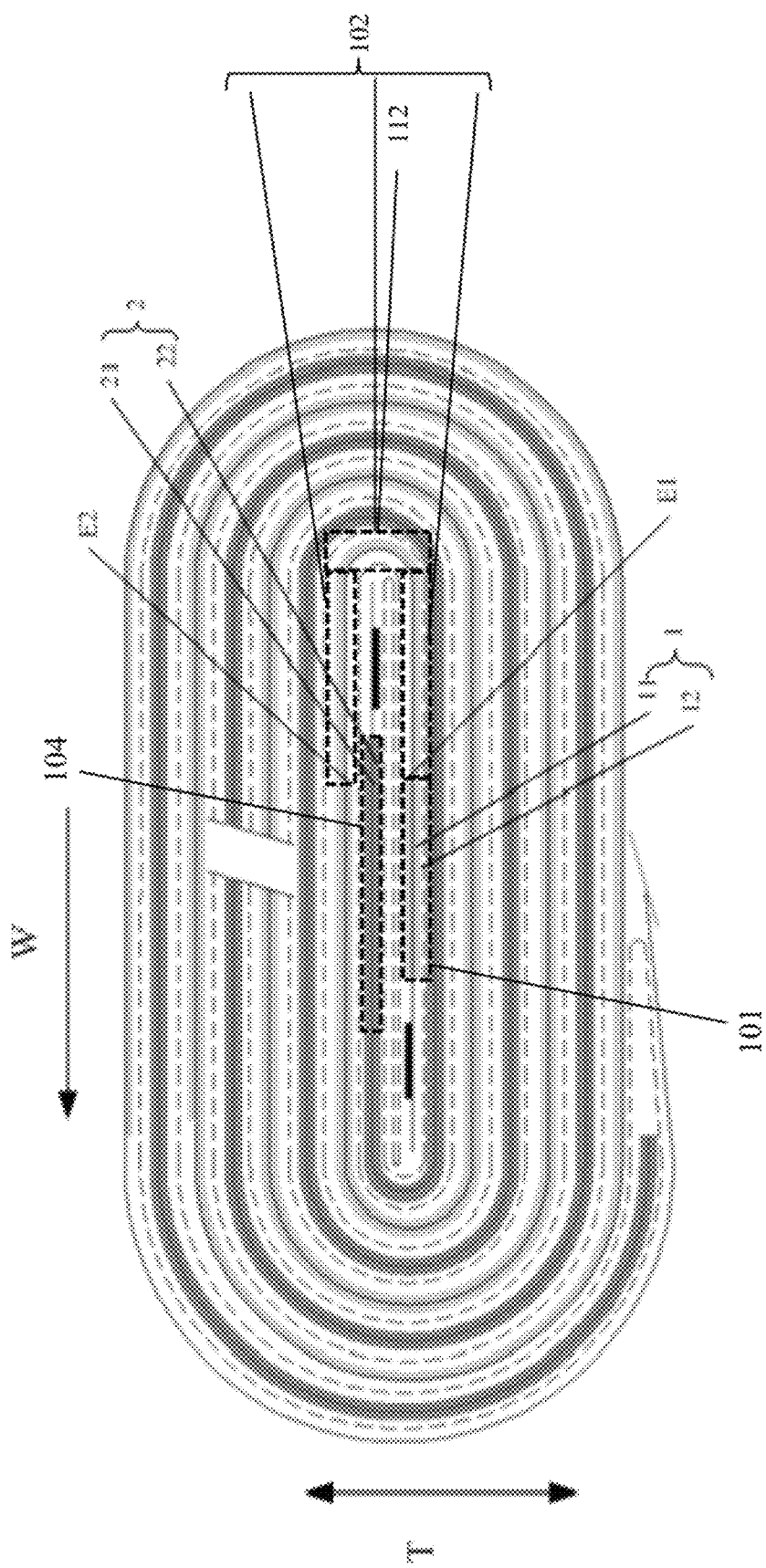
FIG. 1 is a cross-sectional view of the electrode assembly according to some embodiments of the present application.

FIG. 1 illustrates a battery electrode assembly in accordance with one embodiment of the present application including a first electrode sheet 1, a second electrode sheet 2, a separator 3, a first electrode tab 41, and a second electrode tab 42. The various components of the electrode assembly will be described in detail below.

The first electrode sheet 1 has a first current collector 11 and a first active substance layer 12 arranged on the surface of the first current collector 11. The second electrode sheet 2 has a second current collector 21 and a second active substance layer 22 arranged on the surface of the second current collector 21. In the winding direction, the first electrode sheet 1 sequentially includes from the starting end: an empty foil region which the first electrode tab 41 is soldered to; a first section 101 that is a double-sided first active substance layer region; and a second section 102 that is a single-sided first active substance layer region, the second section 102 includes a first bending section 112 where the first electrode sheet 1 is bent for the first time. In the winding direction, the second electrode sheet 2 sequentially includes from the starting end: an empty foil region which the second electrode tab 42 is soldered to; and a third section 103 and a fourth section 104 that is a double-sided second active substance layer region, the third section 103 includes a second bending section 113 where the second electrode sheet 2 is bent for the first time. In an embodiment of the present application, in the width direction W, the first section 101 of the first electrode sheet 1 and the third section 103 of the second electrode sheet 2 extend in opposite different directions, and are wound to form the electrode assembly. In the direction T (the direction T is the thickness direction of the electrode tab), the first active substance layer 12 located inside the first section 101 is opposed to the second active substance layer 22 located inside the third section 103.

In the embodiment illustrated in FIG. 1, the first and second sections 101 and 102 of the first electrode sheet 1 include regions applied with an active substance on one surface. Thus, compared with the first electrode sheet 1 and the second electrode sheet 2 of which are not applied with active substance on the winding starting section, the current collectors of the first electrode sheet 1 and/or the second electrode sheet 2 of the electrode assembly provided by the embodiments are applied with active substances on one surface to further increase the energy density and effectively utilize the space. Since there is no the first active substance layer on the surface of the second section 102 of the first electrode sheet 1 facing the center of the electrode assembly, and the projections of both the starting end E1 and the finishing end E2 of the second section 102 on the third section 103 in the projection of the direction T fall on the third section 103, the third section 103 is a region on both surfaces of which a second active substance layer exists. The first electrode sheet is a positive electrode, and may be a positive lithium-containing coating such as a lithium iron phosphate coating or a lithium cobaltate coating, and the second electrode sheet is a negative electrode, and may be a graphite coating. In addition, preferably in the direction W, specifically in the direction of the second section 102 along the winding direction, E1 and E2 respectively exceed the starting position of the second section 102, and the excess distance ranges from 1-10 mm, more preferably 1-3 mm. Exceeding a distance of less than 1 mm is not effective for safety, and the active substance is wasted when the distance is exceeded greater than 10 mm. This structure design reduces occurrence of the situation that the lithium ions in the positive electrode coating on the second segment of the first electrode sheet 1 undergo lithium deposition during electrode deposition in the negative electrode coating on the first section 101 of the second electrode sheet during the battery cycle, thereby reducing the risk of lithium decompositions at the bending portion and improving safety performance. In other embodiments, a region applied with active substance on one surface may be provided on the winding starting section of the second electrode sheet 2. Or, a region applied with active substance on one surface may be provided on both the winding starting sections of the second electrode sheet 2 and the first electrode sheet 1.

Preferably, one surface of a region applied with active substance on one surface facing the center of the electrode assembly is not applied with active substance on the winding starting section of at least one of the second electrode sheet 1 and the first electrode sheet 2. As illustrated in FIG. 1, the winding starting section of the first electrode sheet 1 is not applied with an active substance on the side facing the center of the electrode assembly.

Preferably, the starting end E1 and the finishing end E2 of the region applied with active substance on one surface of the first winding starting section of the first electrode sheet 1 have a projection falling on the second winding starting section of the second electrode sheet 2 in the thickness direction T. Or, in other embodiments, the starting end and the finishing end of the region applied with active substance on one surface of the second winding starting section of the second electrode sheet 2 has a projection falling on the first winding starting section of the first electrode sheet 1 in the thickness direction T (this embodiment is not illustrated in figures). Thereby, the total thickness of the first electrode tab 41 or the second electrode tab 42 in the thickness direction T may be further reduced, and the active substance may be saved.

Figure 2:
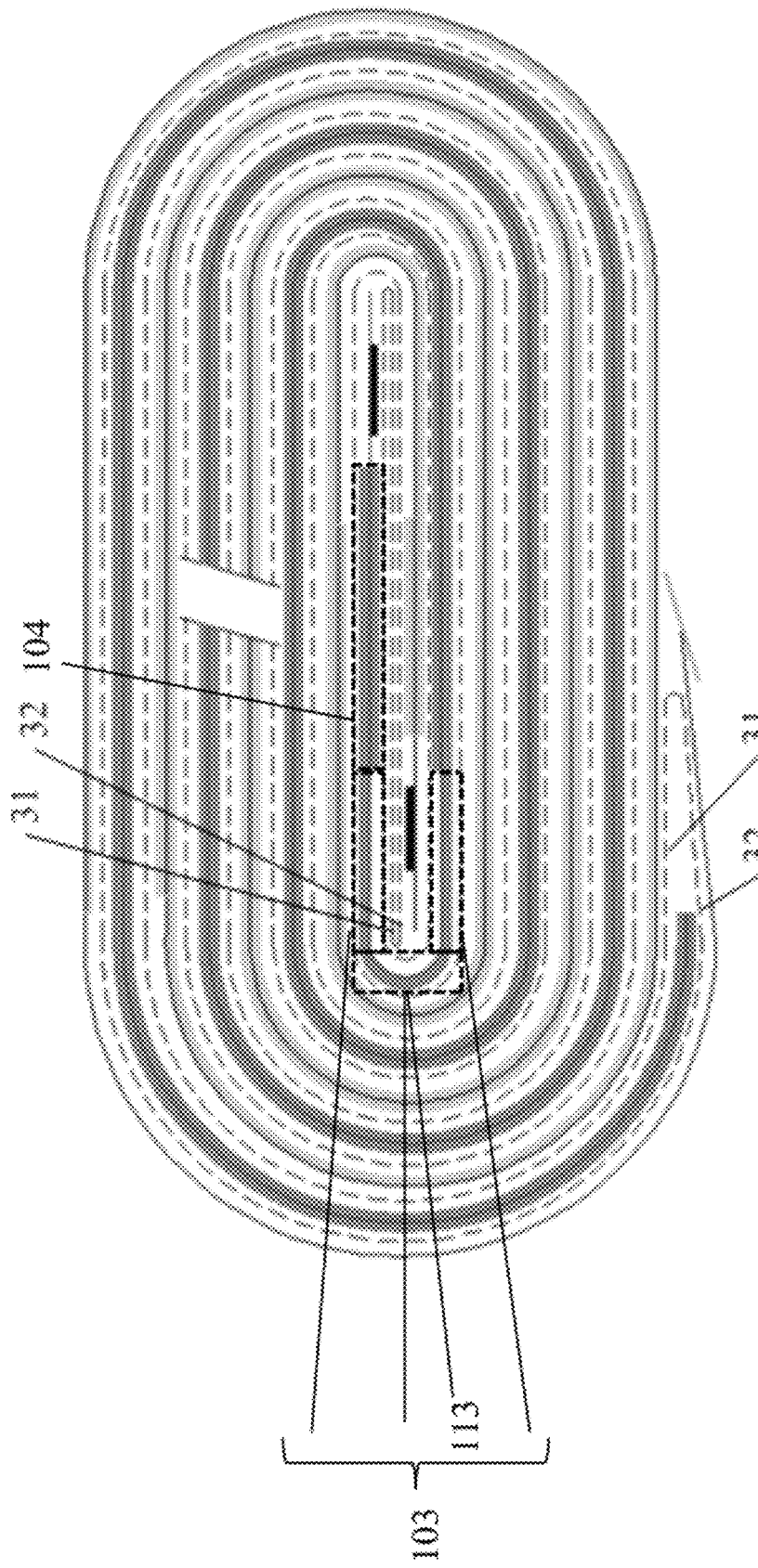
FIG. 2 is a cross-sectional view of the electrode assembly according to some embodiments of the present application.

With reference to FIG. 2, the separator 3 of the electrode assembly is arranged between the first electrode sheet 1 and the second electrode sheet 2 to isolate the first electrode sheet 1 from the second electrode sheet 2. In some embodiments, the separator 3 located between the first electrode sheet 1 and the second electrode sheet 2 may be one or more layers. When the separator 3 located between the first electrode sheet 1 and the second electrode sheet 2 has two layers, which are the first separator 31 and the second separator 31, respectively. In order to prevent the starting end or the trailing end of the first electrode sheet 1 or the second electrode sheet 2 from being wrinkled and folded, the starting end of the first separator 31 and the starting end of the second separator 32 are bonded to each other to form a closure and/or the trailing end of the first separator 31 and the trailing end of the second separator 32 are bonded to each other to form a closure. In the embodiment illustrated in FIG. 2, the starting end of the first separator 31 is closed with the starting end of the second separator 32, and the trailing end of the first separator 31 is closed with the trailing end of the second separator 32.

Figure 3:
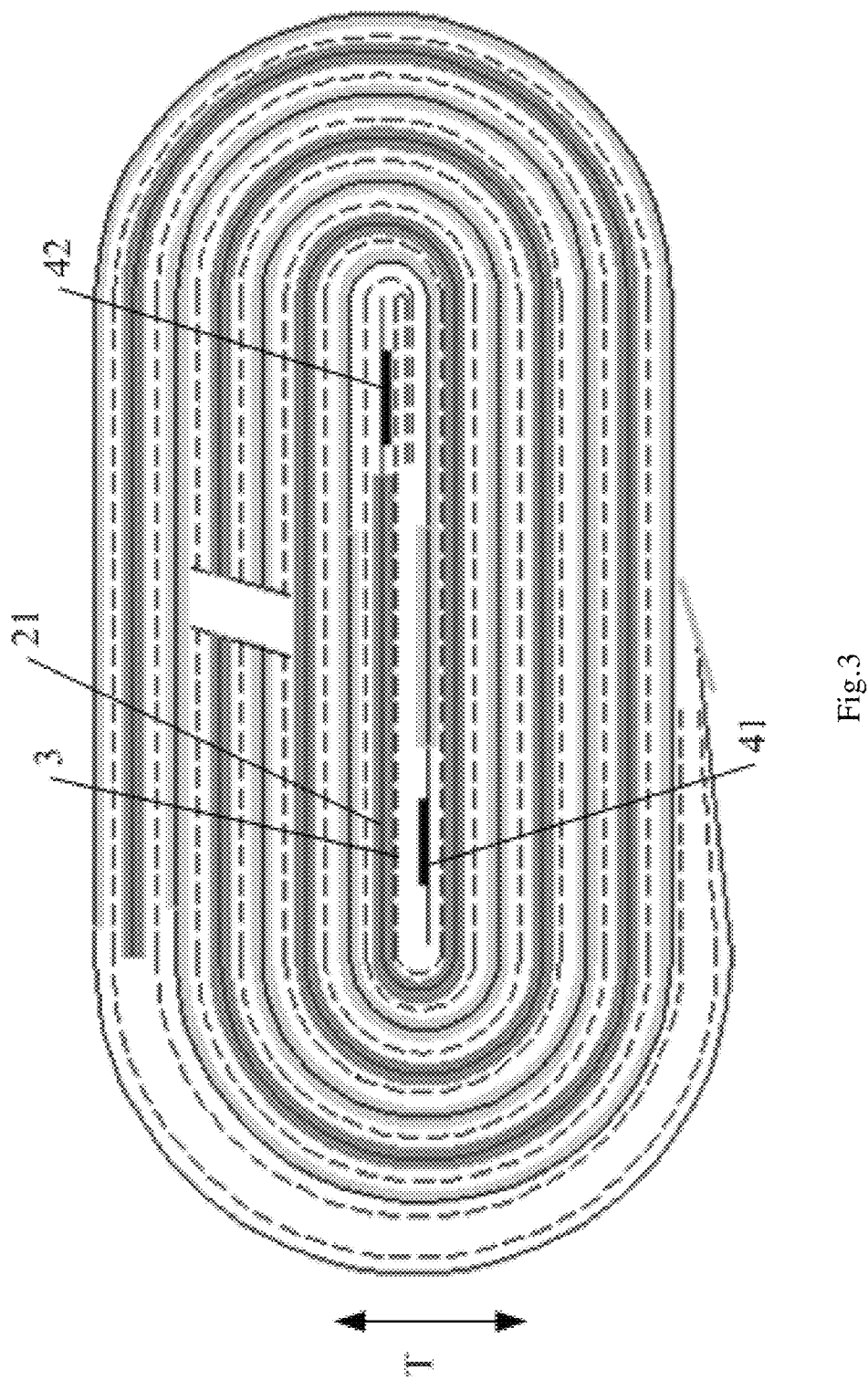
FIG. 3 is a cross-sectional view of the electrode assembly according to some embodiments of the present application.

With reference to FIG. 3, in an embodiment of the present application, the electrode assembly further includes a first electrode tab 41 electrically connected to the first current collector 11 and a second electrode tab 42 electrically connected to the second current collector 21, the first electrode tab 41 being one or more and the second electrode tab 42 being one or more. Among them, in the thickness direction T of the electrode assembly, the separator 3 overlapping in the inner side of the electrode assembly at the position corresponding to at least one of the first electrode tab 41 and the second electrode tab 42 does not exceed 2 layers, so that the thickness of the entire electrode assembly in the thickness direction T of the first electrode tab 41 and/or the second electrode tab 42 is reduced. For example, it is illustrated in FIG. 3 that the separator 3 between the first electrode tab 41 and the second current collector 21 is only one-layer.

Figure 4:
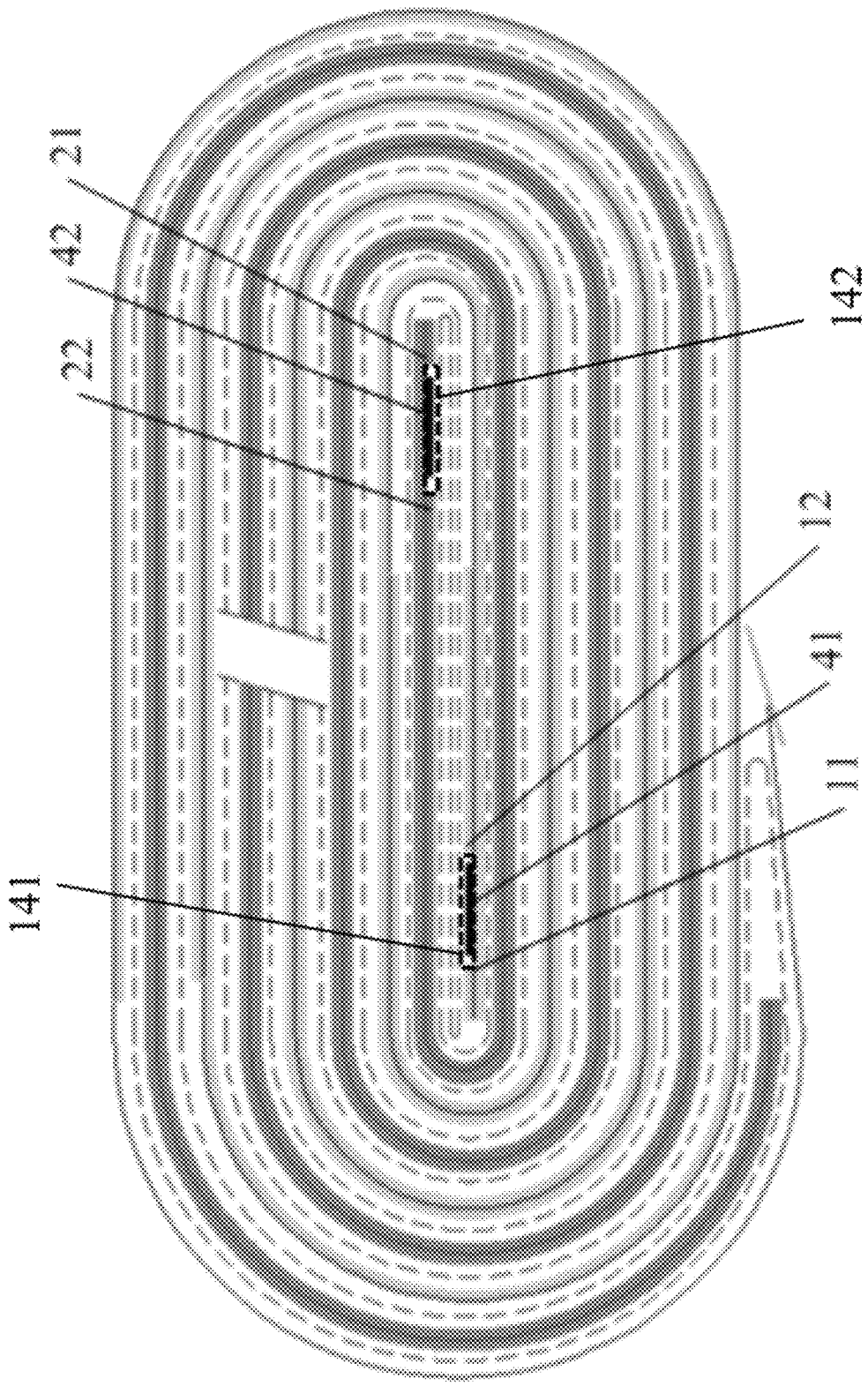
FIG. 4 is a cross-sectional view of the electrode assembly according to some embodiments of the present application.

With reference to FIG. 4, regarding the arrangement of the first electrode tab 41 and the second electrode tab 42, in an embodiment of the present application, the first electrode sheet 1 further includes a first gap 141, the bottom of which is an exposed blank first current collector 11 and the circumferential side of which is the first active substance layer 12, thereby the first electrode tab 41 being placed in the first gap 141 and electrically connected to the first current collector 11; and/or the second electrode sheet 2 further includes a second gap 142, with the bottom of which is an exposed blank second current collector 21 and the circumferential side of which is the second active substance layer 22, thereby the second electrode tab 42 being placed in the second gap 142 and electrically connected to the second current collector 21. In another embodiment, the first electrode tab 41 is integrally formed with the first current collector 11; and/or the second electrode tab 42 is integrally formed with the second current collector 21. The so-called integral formation may be achieved by the following means: the first electrode tab 41 and the first current collector 11 belong to the same sheet of foil, and the first electrode tab 41 and the first current collector 11 are formed by cutting the sheet.

In some embodiments, the first electrode sheet 1 is a positive electrode sheet, and the second electrode sheet 2 is a negative electrode sheet. In other embodiments, the first electrode sheet 1 is a negative electrode sheet, and the second electrode sheet 2 is a positive electrode sheet.

Figure 5:
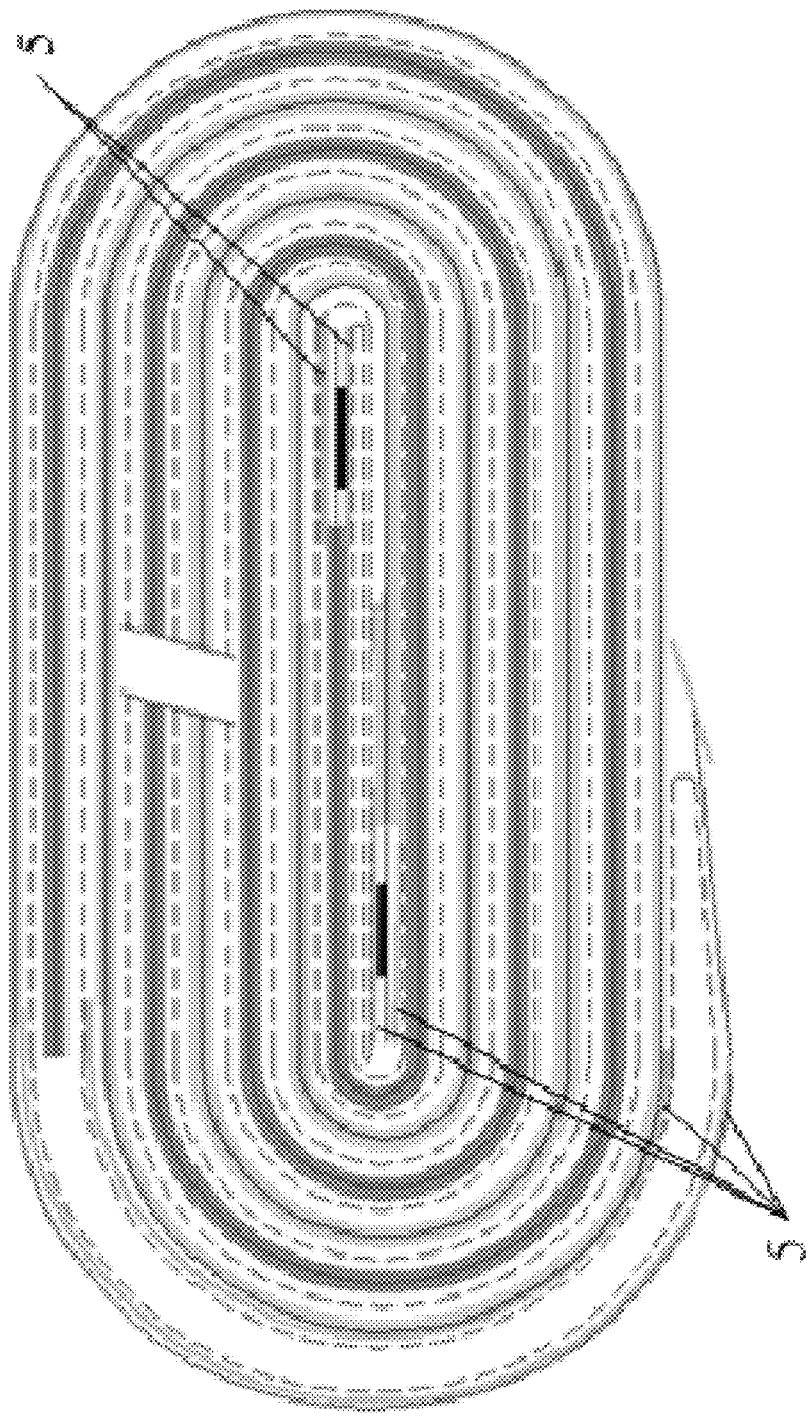
FIG. 5 is a cross-sectional view of the electrode assembly according to some embodiments of the present application.

In some embodiments, in order to avoid circuit short occurring in the positive electrode sheet, an adhesive tape is adhered to at least the starting end and/or the trailing end of the winding starting section of the positive electrode sheet. In other embodiments illustrated in FIG. 5, the adhesive paper 5 is attached to both the starting end and the trailing end of the winding starting section of the positive electrode sheet and the negative electrode sheet.

Figure 6:
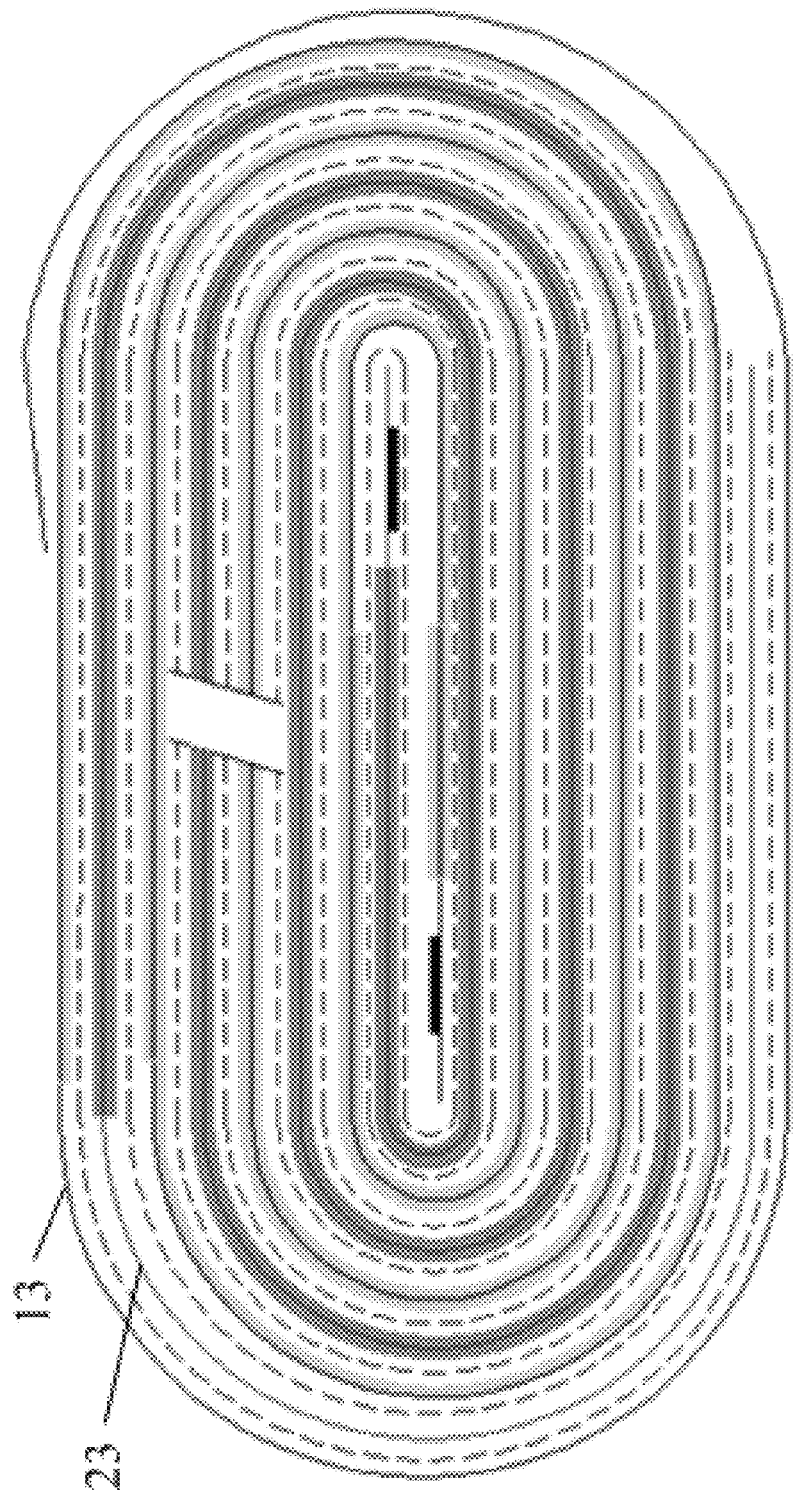
FIG. 6 is a cross-sectional view of the electrode assembly according to some embodiments of the present application.

With reference to FIG. 6, in some embodiments, the trailing end of the first electrode sheet 1 includes a first empty foil region 13 of which the first active substance layer 12 is not arranged on both sides, and the first empty foil region 13 is located at the outermost side of the electrode assembly and at least wraps around the electrode assembly. The trailing end of the second electrode sheet 2 includes a second empty foil region 23 of which both surfaces are not applied with the second active substance layer 22, and the second empty foil region 23 faces the first empty foil region 13. Due to the first empty foil region 13 and the second empty foil region 23, the risk of circuit short occurring in the electrode assembly in extreme cases (when abused) and thereby causing a fire to burn or explode is reduced.

Based on the electrode assembly provided by the embodiments of the present application, providing a region with active substance on one surface at the first bending position of a winding starting section of at least one of the first electrode sheet 1 and the second electrode sheet 2 may reduce the risk of lithium decomposition occurring in at least one of the first electrode sheet 1 and the second electrode sheet 2, thereby prolonging the service life and reducing the security risks.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

The invention claimed is:

1. An electrode assembly, comprising:
  a first electrode sheet;
  a second electrode sheet,
  a separator arranged between the first electrode sheet and the second electrode sheet, and
  an adhesive tape;
  wherein the first electrode sheet comprises:
    a first current collector; and
    a first active substance layer arranged on a surface of the first current collector;
    wherein the first current collector comprises a first section and a second section; the first active substance layer is disposed on both surfaces of the first section, while the first active substance layer is disposed on only one surface of the second section;
    the second section is electrically connected to the first section, and the first section is closer to a starting end of the first electrode sheet than the second section;
    the second section comprises a first bending section, and the first bending section is a region where the first electrode sheet is bent for a first time; and
  wherein the separator comprises a first separator and a second separator, a starting end of the first separator is in direct physical contact with a starting end of the second separator, and a trailing end of the first separator is in direct physical contact with a trailing end of the second separator, and the adhesive tape is adhered to at least a starting end or a trailing end of the second electrode sheet.

2. The electrode assembly according to claim 1, further comprising:
  wherein the second electrode sheet comprising a second current collector and a second active substance layer disposed on a surface of the second current collector;
  wherein the second current collector comprises a third section and a fourth section, and the third section is electrically connected to the fourth section, and the third section is closer to the starting end of the second electrode sheet than the fourth section;
  wherein the second active substance layer are disposed on both surfaces of the third section, the second active substance layer is disposed on only one surface of the fourth section, the fourth section comprises a second bending section, and the second bending section is a region where the second electrode sheet is bent in a winding direction for a first time.

3. The electrode assembly according to claim 2, wherein orthographic projections of a starting end and a finishing end of the second section fall on the third section in a direction T.

4. The electrode assembly according to claim 3, wherein the first section and the third section extend in opposite directions in a direction W perpendicular to the direction T;
and the first active substance layer is located inside the first section facing the second active substance layer located inside the third section.

5. The electrode assembly according to claim 1, further comprising:
  a first electrode tab electrically connected to the first current collector;
  wherein the number of the separator between the first electrode tab and the second current collector does not exceed two layers in the direction T.

6. The electrode assembly according to claim 5, wherein the first active substance layer comprises a first gap configured to receive the first electrode tab, the first electrode tab is electrically connected to the first current collector; and
  the second active substance layer comprises a second gap configured to receive a second electrode tab, and the second electrode tab is electrically connected to the second current collector.

7. The electrode assembly according to claim 6, wherein the first electrode tab is integrally formed with the first current collector, and the second electrode tab is integrally formed with the second current collector.

8. The electrode assembly according to claim 1, wherein the first electrode sheet comprises a first empty foil region of which either surface is not applied with the first active substance layer, and the first empty foil region is arranged at a trailing end of the first electrode sheet; and
  the second electrode sheet comprises a second empty foil region of which either surface is not applied with the second active substance layer, the second empty foil region is arranged at a trailing end of the second electrode sheet, and the second empty foil region faces the first empty foil region.

9. A battery, comprising an electrode assembly, the electrode assembly comprising a first electrode sheet, a second electrode sheet, and a separator arranged between the first electrode sheet and the second electrode sheet and an adhesive tape,
  wherein the first electrode sheet comprises:
    a first current collector; and
    a first active substance layer arranged on a surface of the first current collector;
    wherein the first current collector comprises a first section and a second section; the first active substance layer is disposed on both surfaces of the first section, while the first active substance layer is disposed on only one surface of the second section;
    the second section is electrically connected to the first section, and the first section is closer to a starting end of the first electrode sheet than the second section;
    the second section comprises a first bending section, and the first bending section is a region where the first electrode sheet is bent for a first time; and
  wherein the separator comprises a first separator and a second separator, a starting end of the first separator is in direct physical contact with a starting end of the second separator, and a trailing end of the first separator is in direct physical contact with a trailing end of the second separator, and the adhesive tape is adhered to at least a starting end or a trailing end of the second electrode sheet.

10. The battery according to claim 9,
  wherein the second electrode sheet comprising a second current collector and a second active substance layer disposed on a surface of the second current collector,
  wherein the second current collector comprises a third section and a fourth section, the third section is electrically connected to the fourth section, and the third section is closer to the starting end of the second electrode sheet than the fourth section;

wherein the second active substance layer are disposed on both surfaces of the third section, the second active substance layer is disposed on only one surface of the fourth section, the fourth section comprises a second bending section, and the second bending section is a region where the second electrode sheet is bent in a winding direction for a first time.

11. The battery according to claim 10, wherein orthographic projections of a starting end and a finishing end of the second section fall on the third section in a direction T.

12. The battery according to claim 11, wherein the first section and the third section extend in opposite directions in a direction W perpendicular to the direction T; and the first active substance layer located inside the first section faces the second active substance layer located inside the third section.

13. The battery according to claim 9, further comprising:
a first electrode tab electrically connected to the first current collector;
wherein the number of the separator between the first electrode tab and the second current collector does not exceed two layers in the direction T.

14. The battery according to claim 13, wherein the first active substance layer defines a first gap configured to receive the first electrode tab, and the first electrode tab is electrically connected to the first current collector; and
the second active substance layer comprises a second gap configured to receive a second electrode tab, and the second electrode tab is electrically connected to the second current collector.

15. The battery according to claim 14, wherein the first electrode tab is integrally formed with the first current collector, and the second electrode tab is integrally formed with the second current collector.

16. The battery according to claim 9, wherein the first electrode sheet comprises a first empty foil region of which either surface is not applied with the first active substance layer, and the first empty foil region is arranged at a trailing end of the first electrode sheet; and
the second electrode sheet comprises a second empty foil region of which either surface is not applied with the second active substance layer, the second empty foil region is arranged at a trailing end of the second electrode sheet, and the second empty foil region faces the first empty foil region.

17. An electrode assembly, comprising:
a first electrode sheet;
a second electrode sheet, and
a separator arranged between the first electrode sheet and the second electrode sheet,
wherein the first electrode sheet comprises:
a first current collector; and
a first active substance layer arranged on a surface of the first current collector;
wherein the first current collector comprises a first section and a second section; the first active substance layer is disposed on both surfaces of the first section, while the first active substance layer is disposed on only one surface of the second section;
the second section is electrically connected to the first section, and the first section is closer to a starting end of the first electrode sheet than the second section;
the second section comprises a first bending section, and the first bending section is a region where the first electrode sheet is bent for a first time; and
wherein the separator comprises a first separator and a second separator, a starting end of the first separator is in direct physical contact with a starting end of the second separator, and a trailing end of the first separator is in direct physical contact with a trailing end of the second separator, wherein the second electrode sheet comprising a second current collector and a second active substance layer disposed on a surface of the second current collector;
wherein the second current collector comprises a third section and a fourth section, and the third section is electrically connected to the fourth section, and the third section is closer to a starting end of the second electrode sheet than the fourth section; wherein the second active substance layer are disposed on both surfaces of the third section, the second active substance layer is disposed on only one surface of the fourth section, the fourth section comprises a second bending section, and the second bending section is a region where the second electrode sheet is bent in a winding direction for a first time, and wherein orthographic projections of a starting end and a finishing end of the second section fall on the third section in a direction T.

\* \* \* \* \*